United States Patent [19]

Weitzen

[11] 4,420,400
[45] * Dec. 13, 1983

[54] HYDROCARBON PRODUCTS DAMAGE CONTROL SYSTEMS

[75] Inventor: William Weitzen, Bethesda, Md.

[73] Assignee: General Technology Applications, Inc., Reston, Va.

[*] Notice: The portion of the term of this patent subsequent to Jul. 20, 1999 has been disclaimed.

[21] Appl. No.: 341,617

[22] Filed: Jan. 22, 1982

Related U.S. Application Data

[63] Continuation-in-part of Ser. No. 156,626, Jun. 5, 1980, abandoned.

[51] Int. Cl.³ .............................. C02C 1/22; C02C 1/54
[52] U.S. Cl. .................................... 210/710; 210/128; 210/732; 210/925; 137/13; 241/65
[58] Field of Search ............... 210/774, 925, 693, 723, 210/710, 728, 732, 242; 137/13; 241/65

[56] References Cited

U.S. PATENT DOCUMENTS 4,031,707  6/1977  Ross et al. .................... 210/242.3
4,129,431 12/1978  Ross et al. .................... 210/924
4,340,076  7/1982  Weitzen ......................... 137/13

*Primary Examiner*—Peter A. Hruskoci
*Assistant Examiner*—Sharon T. Cohen
*Attorney, Agent, or Firm*—Roland H. Shubert

[57] ABSTRACT

Spilled liquid hydrocarbon products ranging from crude oil to refined fractions and discrete compounds are converted from a liquid to a gel or to a semi-solid or solid state by contacting a liquid petroleum product with a slurry of cryogenically comminuted polymer particles in a liquified refrigerant gas. The technique is particularly appropriate for control of oil spills in a water environment wherein the oil is either floating on or dispersed in water. Contact of the polymer particles with liquid hydrocarbons results in virtually instantaneous solvation of the polymer in the hydrocarbon to produce a cohesive gel or a semi-solid to solid material at a polymer concentration ranging generally from about 0.2% to 1% for gel formation and from about 1% to 30% for formation of a semi-solid to solid material based on hydrocarbon weight.

23 Claims, 4 Drawing Figures

HYDROCARBON PRODUCTS DAMAGE CONTROL SYSTEMS

CROSS-REFERENCE TO RELATED APPLICATIONS

This application is a continuation-in-part of application Ser. No. 156,626 filed June 5, 1980 now abandoned.

BACKGROUND OF THE INVENTION

1. Field of the Invention

This invention relates generally to a method for controlling liquid hydrocarbon spills.

More particularly, this invention relates to a method for bodying spilled hydrocarbon liquids to render those liquids non-flowing and amenable to recovery.

In one specific embodiment of the invention, oil spilled on water is contained and immobilized by dissolving in the oil particles of a relatively high molecular weight cryogenically comminuted, rubbery polymer applied to the oil as a slurry in a liquid cryogenic refrigerant.

2. Description of the Prior Art

A wide variety of solid materials have been used to absorb spilled liquid hydrocarbons. Materials commonly used include straw, newspaper, expanded perlite, and a number of polymeric materials of various compositions and configurations. Examples of polymers used to absorb and recover spilled hydrocarbons include particulate expanded polystyrene and polystyrenebutadione as shown by U.S. Pat. No. 3,929,631; a foam of an ethylene-alkyl acrylate copolymer recited in U.S. Pat. No. 3,819,514; granular polyurethane particles described in U.S. Pat. No. 3,657,125 and polyolefin fibers applied as a water slurry as shown by Japanese Patent No. 49-96980.

It is also known to apply refrigerants including solid or liquid carbon dioxide and liquid nitrogen to oil spills on water for the purpose either of solidifying the oil or of manipulating its movement. Cole et al in U.S. Pat. No. 3,614,873, for example, disclose the use of solid carbon dioxide particles of freeze oil floating on water thus allowing mechanical removal to the oil from the water. Ross et al in U.S. Pat. Nos. 4,031,707 and 4,129,431 disclose techniques for manipulating, or herding, a petroleum mass on water using blocks of solid carbon dioxide or other low temperature material to change the surface tension of the petroleum or to solidify it. Techniques utilizing refrigeration produce effects which necessarily are transitory in nature as both a water body and the atmosphere act as essentially infinite heat sinks which rapidly bring the chilled oil back to temperature equilibrium with the ambient environment.

It has also been recognized that a number of hydrocarbon polymers affect the viscosity characteristics of the hydrocarbon liquid in which they are dissolved. At low concentrations of polymer in hydrocarbon, in the general range of about 5 to 1000 ppm (0.0005% to 0.1%), the fluid flow friction loss is substantially reduced and this effect is utilized on a commercial basis to increase flow of crude oil and petroleum products through pipelines. At somewhat higher polymer concentrations, on the order of 2000 to 5000 ppm (0.2% to 0.5%), a significant increase in viscosity of the hydrocarbon is observed. At and above about 5000 ppm the liquid begins to gel and at still higher polymer concentrations above about 2% depending upon the particular liquid hydrocarbon or hydrocarbon fraction, the liquid becomes a rubbery semi-solid or solid.

It is common knowledge in the art that non-cross-linked solid polymers are soluble to varying degrees in compatible liquids. The linear hydrocarbon polymers in general and the rubbery hydrocarbon polymers specifically are known to display a relatively high degree of solubility in hydrocarbon liquids. Examples of rubbery hydrocarbon polymers which display a significant degree of solubility in hydrocarbon liquids such as crude oil or kerosene include polyisoprene, polybutadiene, styrene-butadiene copolymers, polyisobutylene and the like.

However, it is also recognized in the art that relatively high molecular weight polymers dissolve very slowly even in the best of solvents. Hours, days or even weeks of contact are required to dissolve such polymers in hydrocarbons at modestly high concentration levels. For example, Meier et al in U.S. Pat. No. 3,801,508 show that 22 hours of stirring contact was required to completely dissolve 1.5 grams of hydrogenated polyisoprene in 200 cc of cyclohexane. Dissolving the same polymer under identical conditions in West Texas crude oil required 70 hours. Attempts to dissolve ethylene-propylene copolymers in the same solvents were incomplete at the end of 168 hours.

Prior art approaches to dissolving a polymer in a liquid hydrocarbon generally include contacting the polymer with the hydrocarbon at ambient to relatively elevated temperatures. It is generally accepted that an increase in temperature will speed dissolution of the polymer as will an increase in surface area as by comminution of the polymer into relatively small particles. Because many of the rubbery polymeric materials are relatively soft and resilient, they are extremely difficult and often impossible to comminute by conventional grinding techniques. Even after comminution, the so-formed particles tend to stick and clump together thus negating the practical effect of comminution.

One example of prior art techniques for dissolving rubbery polymers; i.e., polyisobutylene, in hydrocarbons such as kerosene is shown by U.S. Pat. No. 3,215,154. Patentees disclose that a commercial polyisobutylene resin preground to a particle size of about 10 to 20 U.S. standard screen scale requires some 2 hours of stirring contact with kerosene until the solution attains sufficient viscosity to keep the undissolved resin particles dispersed. Another 3 to 5 hours is required for complete dissolution of the polymer particles. Patentees also teach that heating up to about 200° F. increases the rate of solution.

It can thus be appreciated that, were prior art techniques used in the application of polymer particles to spilled hydrocarbons, little if any practical change in the physical characteristics of the spilled hydrocarbon could be expected.

SUMMARY OF THE INVENTION

I have found that application of cryogenically ground polymer particles in the form of a slurry with a cryogenic refrigerant to spilled petroleum products, especially in a water environment, results in an essentially instantaneous dissolution of the polymer in the liquid which bodies the liquid to form a semi-solid to solid elastomeric gel which may act as a barrier to further spread of hydrocarbons across a water surface. Application of the slurry at a hydrocarbon leakage point, especially an underwater leakage point, acts to immediately gel the hydrocarbon preventing fractionation and sinking of the heavier components thereof and renders the hydrocarbon easily collectable on the water surface. Particularly preferred systems include rubbery hydrocarbon polymers, for example, polyisobutylene, applied as a slurry in liquid nitrogen. The slurry may be applied to oil floating on water using a dispensing spray head.

Hence, it is an object of this invention to immobilize spilled liquid hydrocarbons by thickening them to a semi-solid or solid form.

Another object of this invention is to generate a retaining border around an oil slick floating on a water surface.

Yet another object of this invention is to agglomerate spilled liquid hydrocarbons into a form amenable to handling, recovery and subsequent refining.

A further object of this invention is to provide means for dispersing a polymer slurry onto the surface of an oil slick.

Another object of this invention is to gel spilled or leaked hydrocarbon underwater so as to prevent fractionation and sinking of heavier fractions and to render the total hydrocarbon mass recoverable and subsequently refinable.

Yet another object of his invention is to provide a method for introducing a cryogenic polymer slurry into an underwater hydrocarbon leak.

DISCUSSION OF THE INVENTION

As described in greater detail in my copending patent application Ser. No. 117,235, filed Jan. 31, 1980 U.S. Pat. No. 4,340,076, the disclosure of which is herein incorporated by reference, it has been found that certain polymers can be caused to almost instantaneously dissolve in, or form a gel with, compatible liquid vehicles provided certain criteria are met. As a result, there is formed a solution or a dispersion of the polymer on essentially the molecular level to form an infinitely dilutable blend or system.

To obtain these results, it is necessary that the polymeric material be cryogenically comminuted. By this is meant comminuting below about $-70°$ to $-75°$ C. and, in the case of rubbery polymers, substantially below their embrittlement temperature as well. The use of liquid nitrogen, which boils at $-195.5°$ C., as the cryogenic refrigerant is preferred. Other cryogenic refrigerants may also be used as, for example, liquified carbon dioxide, liquified air in some instances, liquified halogenated hydrocarbons and liquified noble gases including helium and argon.

Comminution may be accomplished by first slicing or chopping a polymer slab, which has been cryogenically cooled by contact with liquid nitrogen or other refrigerant, into smaller pieces suitable as a feed to an impact mill or similar device. A suitable impact mill may conveniently be of the high speed, rotating hammer type having a suitably sized discharge screen. The polymer is maintained at cryogenic temperatures during and after comminution by refrigerant introduction at appropriate points.

After comminution, the polymer particles must be maintained at cryogenic temperatures until used. This may be most conveniently accomplished by maintaining the particles as a slurry in liquid nitrogen or similar refrigerant. Conventional insulated tanks or other vessels may be used for storage and/or transport of the slurry.

Polymer particles produced and maintained under cryogenic conditions display extremely rapid, almost instantaneous dissolution in those liquids in which they are normally slowly soluble. While the reason for such rapid dissolution is not known with certainty, it is presently postulated that cryogenic comminution produces fracturing of the particles primarily along molecular boundaries with only minor breakage of polymer strands. The resulting particles have active sites on their edges, corners and surfaces whereby high energy surfaces are generated. Such high energy surfaces are believed to assist in the dissolution of the polymer particles in a liquid and maintenance of the particles at cryogenic temperature until contacted with the liquid is effective to preserve the high energy surface of the particles.

The existence of high energy sites on cryogenically comminuted polymer particles has been experimentally verified by means of electron spin resonance analysis. Data obtained by such analysis demonstrates the presence of free radicals in the polymer particles. The most likely locus of those free radicals is the particle surfaces as this is where fracturing occurred. If the polymer particles are allowed to warm, or be contaminated, the concentration of free radicals decreases and eventually disappears, probably by reaction with atmospheric oxygen, water vapor or other active contaminant compounds. At this point, the polymer particles become indistinguishable in solubility characteristics from non-cryogenically treated particles of the same polymer.

Polymers suitable for use in this invention include all those which can be caused to dissolve in liquid hydrocarbons to the extent that the liquid is bodied or thickened to form a coherent gel or a non-flowing semi-solid or solid material. Most generally, this requires a polymer solubility of at least about 2% by weight depending to some extent upon polymer molecular weight and upon the original viscosity characteristics of the liquid hydrocarbon. However, gelling of hydrocarbons sufficient to prevent their separation into fractions and to promote their collectability on a water surface can be accomplished at much lower concentration. Suitable candidate polymers may be identified by examining their solubility in liquid hydrocarbons, it being kept in mind that higher polymer concentrations can be obtained by the technique of this invention than is feasible using conventional dissolution techniques.

A preferred group of polymers for use in this invention include the natural and synthetic, linear, non-cross-linked rubbery hydrocarbon polymers including polyisobutylene, natural rubber, polyisoprene, polybutadiene, polyolefins and the like. It is desirable that the polymer have a relatively high molecular weight; at least about 1,000,000 and more preferably in the range of about 2,000,000 to 40,000,000. Lower molecular weight solid polymers, ranging in molecular weight from a few hundred thousand to about one million are operative in the process but are less preferred because higher polymer concentrations in the hydrocarbon are required with the lower molecular weight polymer to achieve adequate bodying.

After comminution, the polymer particles are maintained at cryogenic temperatures as a slurry of particles in liquid refrigerant, preferably liquid nitrogen. For reasons of economy in transport and storage, it is desirable to maintain as high a concentration of polymer particles in the liquid refrigerant as is possible. The weight ratio of polymer particles to liquid nitrogen may be as low as about 1:1 while still maintaining a flowable and pumpable dispersion. For most applications, a weight ratio of polymer to liquid nitrogen ranging from about 1:1 to about 1:4 is convenient and preferred.

Spilled liquid petroleum products are thickened to form a gel of semi-solid to solid consistency by contacting the liquid with sufficient polymer-refrigerant slurry to produce a solution typically containing more than about 2% and preferably about 3% to 10% by weight of polymer in the liquid. Contacting techniques will vary depending upon the circumstances of the spill. In the case of a spill on open water which forms an enlarging oil slick, as happens in a well blowout or tanker accident, the polymer-refrigerant slurry is applied directly onto the surface of the oil slick as at the periphery thereof. Application may be accomplished by spraying or otherwise dispersing the slurry onto the oil surface which may be accompanied by mild agitation of the oil to aid in uniformly dispersing the slurry and to present fresh liquid surfaces to the polymer particles.

Application of the polymer-refrigerant slurry to a hydrocarbon layer floating on water produces a temporary cooling of the hydrocarbon. Usually the degree of cooling is insufficient to significantly affect the viscosity or flow characteristics of the hydrocarbon. This cooling effect is transitory as the hydrocarbon layer rapidly reverts to an equilibrium water-air temperature. Thus, the bodying effect obtained by practice of the invention is not one dependent upon hydrocarbon temperature but rather depends upon the thickening caused by dissolution of the active polymer particles in the hydrocarbon.

When an oil slick is formed on open water, its thickness may range from a small fraction of an inch to several inches depending upon weather conditions, sea state and type of oil involved in the spill. Especially with crude oils and petroleum products, in the general range of API 15° to 40°, the thickening and solidifying action of the polymer-refrigerant slurry can generate a border of rubbery semi-solid to solid material to retain the slick and prevent its further spread. In short, the equivalent of a containment boom may be generated from the crude oil itself.

Generation of a containment border may be accomplished by circling the slick in a boat equipped with a supply of polymer-refrigerant slurry and a controllable boom and spray head for application of the slurry in a continuous path around the periphery of the slick. The border may be further built up by repeated passes of the slurry-applying boat to increase the width and thickness of the solidified border area.

In some cases, application of the slurry to an oil surface may be advantageously accomplished by spraying the slurry from a low-flying helicopter. The down wash created by the helicopter rotor serves to provide agitation of the oil surface tending to aid in the dispersion of the polymer particles in the oil. The dispersing head or nozzle from the helicopter supply tank should be maintained as close as practical to the oil surface that the travel time and distance of the cryogenically comminuted particles is short to preclude warm up in passage.

It has also been found that application of the polymer-refrigerant slurry to a dispersion of oil in water, even when the slurry is injected below the water surface, causes agglomeration and thickening of the dispersed oil globules and droplets. The solidified oil masses display a high degree of buoyancy which is thought to be due to the trapping of evaporating refrigerant gases, such as nitrogen, within the agglomerated mass. In this case, the solidified oil masses may be readily picked up from the water surface using any appropriate mechanical means.

Because the polymer-refrigerant slurry can be injected below the water surface and yet function to agglomerate and thicken dispersed oil, the process of this invention also finds use in controlling spills at an underwater leakage point. Typical sources of underwater leakage of oil include runaway or blown out exploratory or producing off short wells and tanker accidents. A spill from a tanker can occur under widely different circumstances ranging from going aground in a violent storm to a clean collision in calm seas to the springing of a hull plate. When physical access to the leaking tanker is possible, polymer-refrigerant slurry is injected through an insulated lance at the point of leakage or as close to the point of leakage as possible.

It has been recognized that a large measure of the environmental damage resulting from an oil spill in water is caused by heavier oil components sinking and contaminating the sea bottom. This contamination is long lasting as degradation of the heavy oil fractions proceeds but very slowly. Admixture of polymer with crude oil to form a gel decreases or prevents entirely the tendency of the oil to separate into fractions thus reducing or preventing the deposition of heavy fractions on the sea bottom as tar balls and the like. In addition, a polymer-gelled crude oil displays a lower vapor pressure than does the original crude thus reducing evaporation losses of the lighter fractions. Hence, the natural bouyancy of the crude oil is maintained and a more complete recovery of the gelled oil on the water surface can be achieved by conventional physical collection techniques.

In the case of hull damage leaving a clean gash or other open communication through the hull, the polymer-refrigerant slurry may be injected directly into the cargo tank through the hole. Venting of the cargo tank during slurry injection allows escape of the evaporated refrigerant gas and avoids pressure build up within the tank. Substantial slowing of the leakage or even complete plugging of the leak can often be accomplished in this fashion. Especially in this embodiment of the invention, liquid nitrogen is strongly preferred as the refrigerant gas because of its inertness which tends to reduce fire and explosion hazards.

Injection of a polymer-liquid nitrogen slurry directly into a cargo tank produces two complementary effects which both contribute to the slowing or plugging of the leak. First, polymer dissolving in the oil forms a semi-solid to solid rubbery material. Second, evaporation of the liquid nitrogen refrigerant produces a substantial cooling and chilling effect which rapidly increases the viscosity of the oil. Both effects increase the resistance of oil to flow thus reducing the leakage rate or plugging the leak entirely.

Another significant advantage to the process of this invention is that the crude oil or other petroleum products solidified or agglomerated by reaction with the polymer may be readily treated to recover essentially the original product value. Many of the linear, long-chain polymer molecules of the type useful in this invention readily degrade or decompose at moderately elevated temperatures. Polyisobutylene, for example, is known to decompose at temperatures above about 375° to 400° F. Thus, merely heating the recovered polymer-thickened oil in either a batch or continuous fashion causes the polymer to decompose with the result that the oil reverts to its normally liquid state amenable to ordinary refining techniques. Because of its low decomposition temperature as well as its effectiveness in thickening oils, polyisobutylene is one preferred polymer for use in this invention.

DESCRIPTION OF PREFERRED EMBODIMENTS

Figure 1:
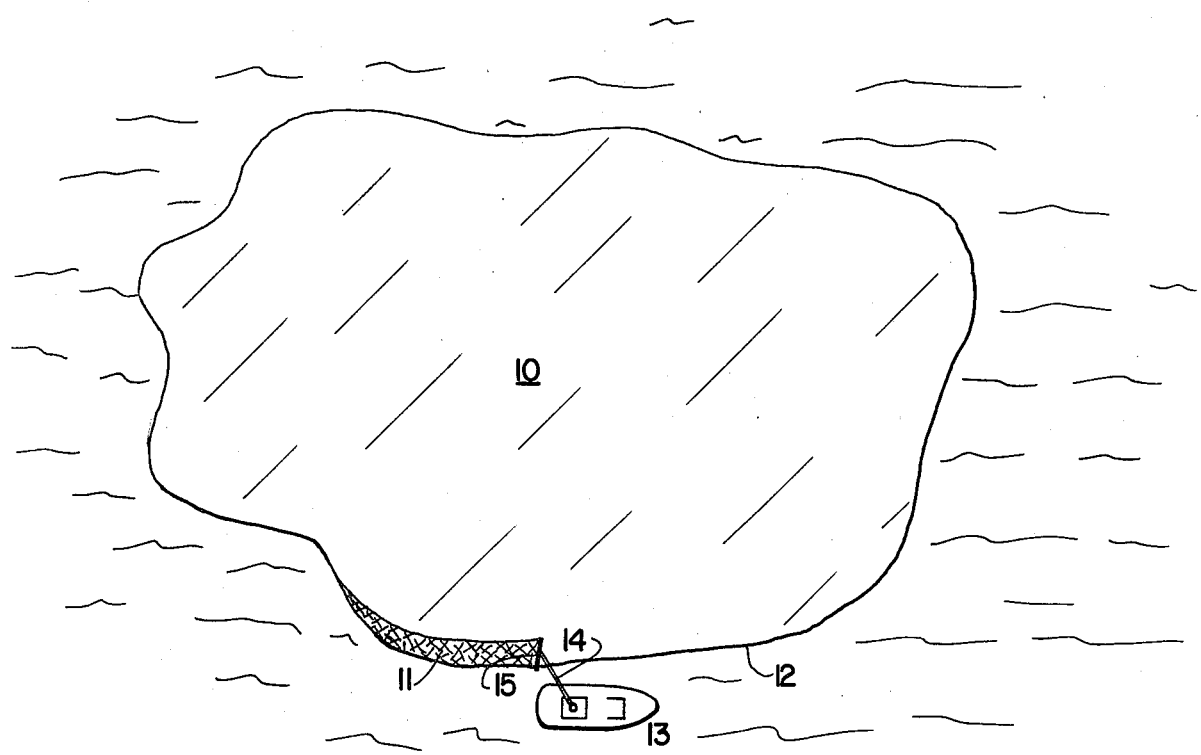
FIG. 1 is a stylized representation of a polymer-cryogenic refrigerant slurry applied to the border of an oil slick according to one embodiment of this invention.
Figure 2:
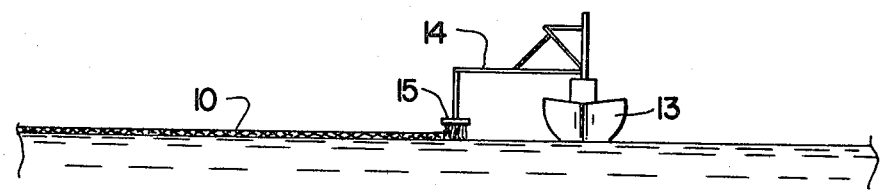
FIG. 2 is another view in greater detail of the embodiment of FIG. 1.

Referring now to FIGS. 1 and 2, there is shown one preferred embodiment of this invention in which an oil spill floating on open water is contained by the formation of a solidified border region around the periphery of the spill.

Oil slick 10, which may vary in size from a few hundred square feet to many square miles, is inhibited from further spreading by the formation of a containment border 11. Border 11 is formed by application of a polymer-cryogenic refrigerant slurry to the surface of the oil around the periphery 12 of the slick. Slurry application may be accomplished using vessel 13 containing a supply of slurry maintained in an insulated tank and delivered as a liquid spray to the oil surface by means of boom 14 and dispersing head 15.

Border 11 is formed by the dissolving or intimate dispersion of polymer particles applied to the oil and forming a solution or gel or semi-solid to solid, but flexible, consistency. Width of the border may conveniently range from a few feet to a few tens of feet. Repeated passes of slurry-applying vessel 13 around the periphery 12 of the oil slick serves to build up the border 11 both in width and to some extent in vertical dimension.

As has been described previously, application of a cryogenically comminuted slurry of polymer particles in a cryogenic refrigerant, suitably liquid nitrogen, to oil floating on or dispersed in water results in an almost instantaneous dissolution of the polymer particles in the oil. Depending upon the polymer composition, its molecular weight, properties of the oil, ambient temperature and polymer concentration in the oil, the resulting solution or gel may range from a thick, extremely viscous rubbery semi-liquid to a flexible solid. A 20 weight percent solution of polyisobutylene in Alaskan North Slope crude oil, for example, is a stretchable, rubbery solid at ambient temperature.

Figure 3:
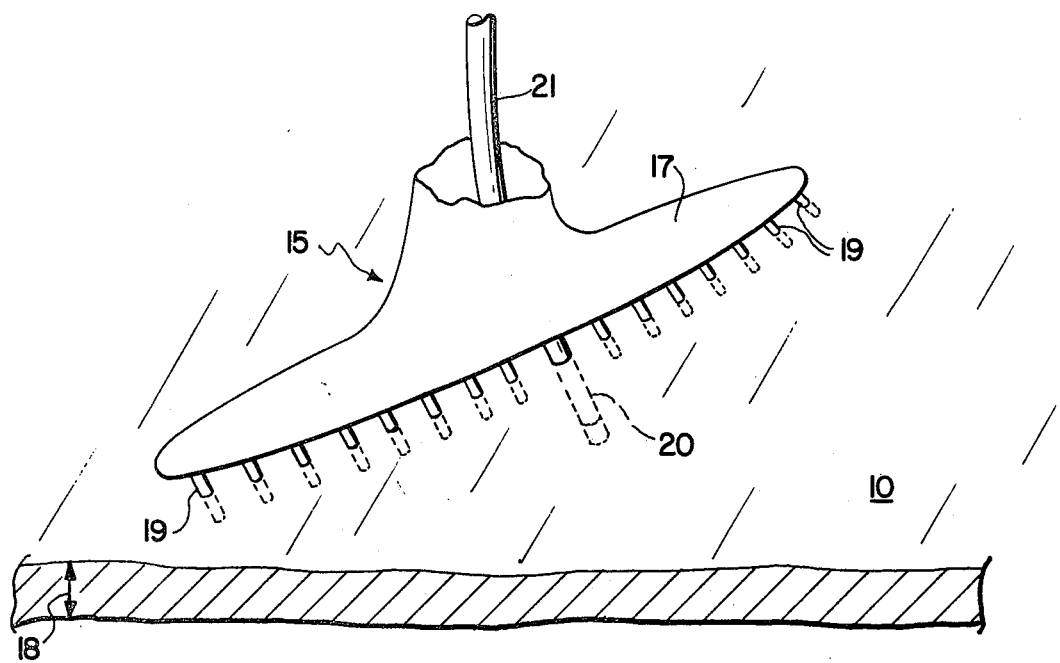
FIG. 3 illustrates a dispersing head suitable for use in applying a polymer-cryogenic refrigerant refrigerant slurry to the surface of an oil slick.

Mild agitation of the oil layer during slurry application may be advantageous as such agitation serves to present fresh oil surfaces to the slurry resulting in a more uniformly solidified mass. Such agitation may be accomplished by use of a dispersing head of the type illustrated in FIG. 3. Referring now to that Figure, there is shown dispersing head 15 having a longitudinally extending body portion 17 disposed above the surface of an oil slick 10 having a thickness 18 as shown in partial cross section.

Disposed along body portion 17 are a plurality of rake-like fingers 19 extending into the oil layer which may serve a dual function of distributing slurry onto or into the layer 10 and agitating the oil layer with movement of the dispersing head. A sensing probe 20, arranged to detect either the surface of the oil layer or the oil-water interface, is operably connected to a suitable servo mechanism (not shown) which functions to maintain the body portion 17 of the dispersing head at a preset height above the fluid surface. Insulated conduit means 21 connects the dispersing head with a slurry supply carried on vessel 13.

Evaporation of the liquid nitrogen portion of the polymer slurry tends to cause local agitation of the oil thus contributing to the effective contacting of polymer particles and oil. In addition, refrigerant evaporation produces a transitory cooling effect but such cooling does not inhibit the dissolution of the polymer in oil.

An oil spill of crude oil may create a spreading oil layer ranging in thickness from a thin film to several inches depending upon the gravity of the crude oil, water temperature and the like. Even with relatively extreme oil layer thicknesses, the amount of polymer-liquid nitrogen slurry required to create a containment border is logistically modest as compared to conventional techniques. For example, a 4-foot wide containment border around a 5 mile perimeter slick of 3 inch thickness would require application of some 20,000 gallons of cryogenically comminuted particulate polymer slurried in some 25,000 to 75,000 gallons of liquid nitrogen to obtain a 20% concentration of polymer in oil. This concentration is sufficient to produce a tough but flexible, highly buoyant, resilient solid.

Figure 4:
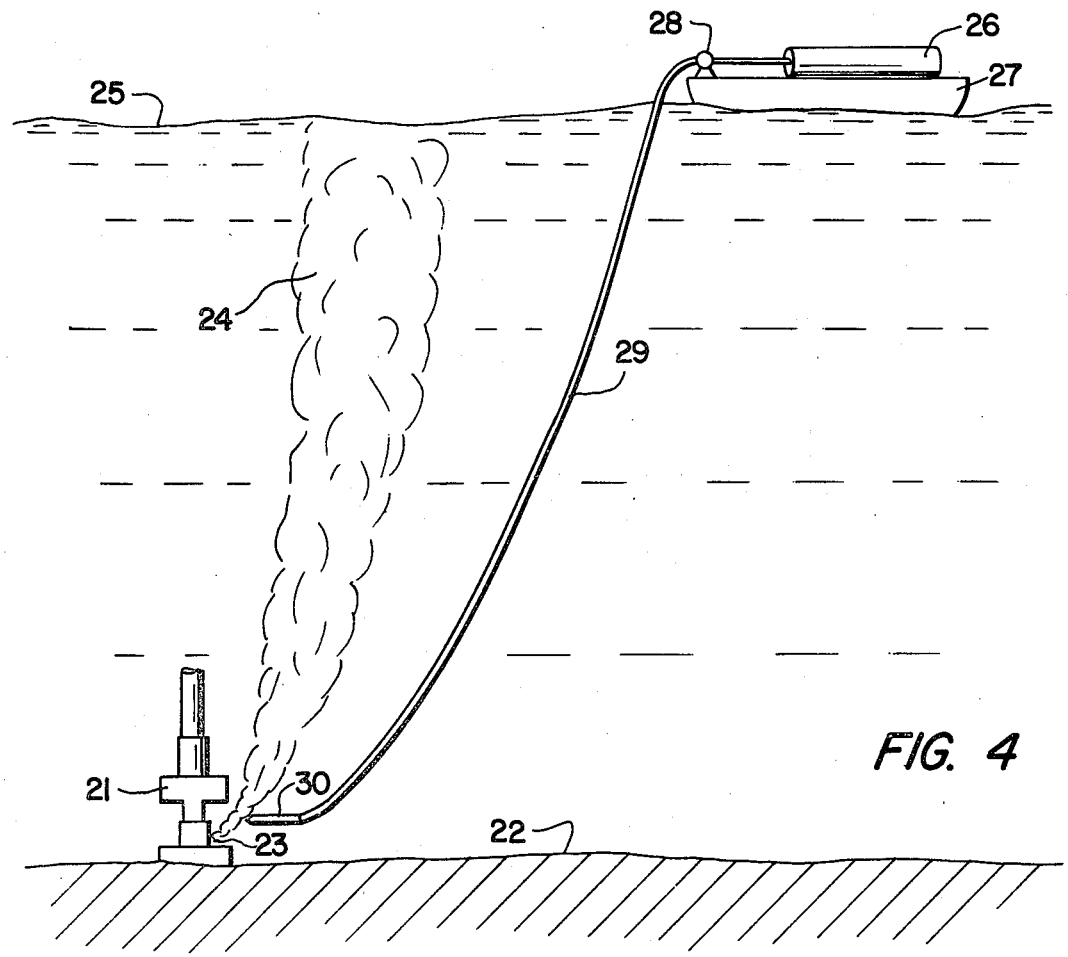
FIG. 4 depicts a technique for introducing a polymer-refrigerant slurry into escaping hydrocarbon at an underwater leakage point.

Referring now to FIG. 4, there is illustrated the injection of a polymer-refrigerant slurry into an escaping oil plume at an underwater leakage point. Well fixture 21, which may be a blowout preventor in the case of an exploratory well or a Christmas tree in the case of a producing well, is emplaced at the top of the well casing at the sea floor 22. Oil escaping from leakage point 23 forms an ascending plume 24 rising to the water surface 25.

A supply of polymer-refrigerant slurry contained in supply tank 26 carried on vessel or barge 27 is conducted by either pump means 28 or utilization of the vapor pressure of liquid nitrogen to eject the slurry through insulated hose or tubing 29 into the leakage site and injected through lance 30 into the escaping oil plume at or in close proximity to leak point 23. Rate of slurry injection is such as to form a cohesive gel upon dissolution or in admixture with the oil stream. In general, it is desirable to inject sufficient slurry so as to obtain a polymer concentration in the hydrocarbon of at least about 0.2%. There results an increase in apparent viscosity of the hydrocarbon together with an increased buoyancy. The buoyancy increase is at least in part due to the trapping, at least on a temporary basis, of gas from the evaporating refrigerant. Polymer addition also inhibits the tendency for crude oil to separate into light and heavy fractions thus reducing or entirely preventing the settling of heavy components to the sea floor in the form of tar balls and the like. Thus, polymer addition preserves the natural buoyancy of the total oil stream and promotes the physical collectability of the oil on the water surface.

The underwater leakage point has been depicted as a well fixture. This same technique is equally applicable to the control of leaking hydrocarbons from an underwater pipeline. Additionally, this technique may be applied to leaks from underwater storage facilities or from tankers. In these latter cases it is advantageous where conditions allow to inject the slurry directly into the storage vessel or tanker hold compartment through the breach in the vessel or compartment wall. Such direct injection tends to sharply reduce the leakage rate or to stop the leak completely by gelling or solidifying hydrocarbon adjacent the breach.

The following examples illustrate particular aspects of the invention which, however, is not to be construed as limited thereby.

EXAMPLE 1

Commercially available polyisobutylene having an intrinsic viscosity (deciliters per gram) of from 5.56 to 7.23, a molecular weight determined by the viscosity averaging method using the viscosity of a solution in isooctane at 20° C. of 4,700,000 and a viscosity (poise) at 20° C. of $1.5 \times 10^{12}$, was cryogenically comminuted to particles having a maximum diameter less than about 0.6 mm. Liquid nitrogen was used to obtain and maintain cryogenic temperature during comminution. The so-prepared particles were then maintained in an insulated vessel as a slurry in liquid nitrogen.

The polymer-liquid nitrogen slurry was then applied to the surface of Sadlerochit (Alaskan North Slope) crude oil floating on water. Immediate thickening of the oil occurred to produce a gummy, rubbery sheet which could be unitarily removed from the water surface.

EXAMPLE 2

A polyisobutylene-liquid nitrogen slurry, produced by cryogenic communication as in Example 1, was applied to the surface of an agitated mixture of Sadlerochit crude oil and water. Agitation was sufficiently intense to disperse the oil in globule and droplet form throughout the water. Upon contact of the polymer-liquid nitrogen slurry with the liquid surface, thickening and agglomeration of the oil occurred forming a mass buoyantly floating on the water surface. The floating oil mass could readily be scooped from the water leaving an essentially clear and oil-free water residue.

EXAMPLE 3

A polyisobutylene-liquid nitrogen slurry, produced by cryogenic comminution as in Example 1, was poured directly into a container of Sadlerochit crude oil. Reaction was essentially instantaneous to produce a blend so viscous that it could not be stirred with a rod. Concentrations of polyisobutylene in the crude oil as high as 30 weight percent were obtained. The samples which contained relatively high polyisobutylene concentrations, above about 10% to 15%, were rubbery, tacky solids at room temperature.

The viscosity of several intermediate concentration samples was determined by the cone and plate method using a Weissenberg rheogoniometer at a temperature of 24° C. At a shear rate of 0.0177 $sec^{-1}$, the viscosity (poise) of a 7.7 weight percent polyisobutylene solution was 50.3 while the viscosity of a 9.4 weight percent solution was 60. At a shear rate of 1.11 $sec^{-1}$, the viscosity of the same two samples was found to be 3.04 and 6.44 poise respectively.

EXAMPLE 4

A quantity of polyisobutylene having a molecular weight of approximately 5.4 million was cryogenically comminuted using liquid nitrogen as the cryogenic refrigerant. The powder thus obtained was allowed to warm to ambient temperature.

One hundred grams of Sadlerochit crude oil was poured onto the top of a water layer in a flat pan. Thereafter, 12 grams of the warmed, cryogenically ground polyisobutylene was dropped onto the surface of the oil in the pan while gently agitating the liquid.

It was observed that the warmed polyisobutylene particles tended to adhere to each other. Shortly after dropping the polyisobutylene particles onto the oil surface there appeared to be some absorption of oil by the particles. However, the bulk of the oil appeared to be completely unaffected. After 30 minutes, it was estimated that about 10% of the oil had been absorbed by the particles. After 48 hours, a significant degree of swelling of the polyisobutylene particles was evident with absorption of oil estimated to be approximately 20 to 25% of the total. The remainder of the oil was fluid and unchanged. Polyisobutylene particles in an undissolved state were evident in the oil.

As is evident from a comparison of results obtained in Examples 1–3 with that obtained by the procedure of Example 4, it is necessary to generate activated polymer particles as by cryogenic comminution and to maintain those particles in an active state until the particles contact the hydrocarbon for the advantages of this invention to be achieved.

EXAMPLE 5

Polyisobutylene was comminuted as in Example 1 to a particle size passing through a 0.035 inch herringbone screen. The comminuted polymer particles were collected in liquid nitrogen. A series of tests was then conducted to determine the flow properties of the polyisobutylene-liquid nitrogen slurries at different ratios of polymer to liquid nitrogen. The following observations were made.

TABLE

| Wt. Ratio, Polymer/LIN* | Slurry Condition |
|---|---|
| 1:3.04 | Very fluid |
| 1:2.09 | Viscous fluid |
| 1:1.45 | Non-rigid slush |

*Liquid nitrogen

The foregoing description and Examples of the invention are intended to be explanatory thereof, and various changes may be made, within the scope of the following claims, without departing from the spirit of the invention.

I claim:

1. A method for bodying spilled liquid hydrocarbons which comprises dissolving sufficient polymer therein to form a non-flowing material of semi-solid to solid consistency by contacting said spilled hydrocarbons with a slurry of cryogenically comminuted polymer particles in a liquid cryogenic refrigerant.

2. The method of claim 1 wherein said cryogenic refrigerant is liquid nitrogen.

3. The method of claim 2 wherein said polymer is a linear, hydrocarbon polymer of relatively high molecular weight.

4. The method of claim 3 wherein said hydrocarbon polymer is a rubbery polymer having a molecular weight in excess of 1,000,000.

5. The method of claim 4 wherein said polymer is polysiobutylene.

6. The method of claim 2 wherein said liquid hydrocarbons are selected from the group consisting of crude oil and refined petroleum fractions and wherein the extent of said bodying ranges from a gel to an elastomeric solid.

7. The method of claim 2 wherein the weight ratio of polymer particles to liquid nitrogen is in the range of about 1:1 to 1:4.

8. The method of claim 3 wherein at least about 2% by weight of polymer is dissolved in said liquid hydrocarbon as a result of said contacting.

9. A method for containing a liquid hydrocarbon spill on water which comprises dissolving a polymer in said hydrocarbon by applying a slurry of cryogenically comminuted polymer particles in a liquid cryogenic refrigerant to the surface of said hydrocarbon in sufficient amount to convert said hydrocarbon from a liquid to a semi-solid or solid state.

10. The method of claim 9 wherein said slurry is applied at an edge of said spill and around the periphery thereof to generate a border of solidified hydrocarbon thereby tending to prevent the further spread of liquid hydrocarbon over the water surface.

11. The method of claim 10 wherein said cryogenic refrigerant is liquid nitrogen.

12. The method of claim 11 wherein said polymer is a linear hydrocarbon polymer having a molecular weight in excess of 1,000,000.

13. The method of claim 12 wherein said polymer is polyisobutylene and said liquid hydrocarbon is crude oil, and wherein greater than 2% by weight of polyisobutylene, based on crude oil weight, is applied to the surface of said oil.

14. The method of claim 13 wherein the weight ratio of polyisobutylene particles to liquid nitrogen in said slurry is in the range of about 1:1 to 1:4.

15. A method for recovering spilled crude oil which comprises dissolving a polymer in said spilled oil by contacting said spilled oil with a slurry of cryogenically comminuted polymer particles in liquid nitrogen, said polymer displaying solubility in said crude oil and being heat decomposable, in an amount sufficient to convert said crude oil to a thickened, semi-solid to solid state, collecting said solidified oil and thereafter heating said solidified oil to a temperature whereat said polymer decomposes and said oil reverts to liquid form.

16. The method of claim 15 wherein said polymer is polyisobutylene and wherein said solidified oil is heated to a temperature above about 400° F.

17. A method for controlling spills of a liquid hydrocarbon at an underwater leakage point which comprises dissolving sufficient polymer in said hydrocarbon to cause agglomeration and thickening of the hydrocarbon by injecting a slurry of cryogenically comminuted polymer particles in a cryogenic refrigerant at or in close proximity to said leakage point.

18. The method of claim 17 wherein said cryogenic refrigerant is liquid nitrogen and wherein said liquid hydrocarbon is crude oil.

19. The method of claim 18 wherein said leakage source is a tanker and wherein said slurry is injected directly into the leaking cargo compartment of said tanker.

20. The method of claim 18 wherein said leakage source is an offshore exploratory or producing oil well.

21. The method of claim 18 wherein said polymer is a linear hydrocarbon polymer having a molecular weight in excess of 1,000,000.

22. The method of claim 21 wherein said polymer is polyisobutylene and wherein the weight ratio of polyisobutylene particles to liquid nitrogen in said slurry is in the range of about 1:1 to 1:4.

23. The method of claim 18 wherein sufficient slurry is injected to provide a polymer concentration in the liquid hydrocarbon of at least 0.2%.

* * * * *